(12) United States Patent
Okachi et al.

(10) Patent No.: US 8,201,162 B2
(45) Date of Patent: Jun. 12, 2012

(54) SOFTWARE UPDATING SYSTEM, SOFTWARE UPDATING METHOD, AND SOFTWARE UPDATING PROGRAM

(75) Inventors: Yuji Okachi, Tokyo (JP); Hayashi Sawada, Kanagawa (JP); Kouhei Tsuchiya, Miyagi (JP)

(73) Assignee: Sony Corporation, Tokyo (JP)

( * ) Notice: Subject to any disclaimer, the term of this patent is extended or adjusted under 35 U.S.C. 154(b) by 1047 days.

(21) Appl. No.: 10/469,485

(22) PCT Filed: Mar. 19, 2002

(86) PCT No.: PCT/JP02/02595
§ 371 (c)(1),
(2), (4) Date: Apr. 5, 2004

(87) PCT Pub. No.: WO02/075525
PCT Pub. Date: Sep. 26, 2002

(65) Prior Publication Data
US 2004/0158817 A1 Aug. 12, 2004

(30) Foreign Application Priority Data
Mar. 19, 2001 (JP) .............................. P2001-077908

(51) Int. Cl.
G06F 9/44 (2006.01)
G06F 15/16 (2006.01)
(52) U.S. Cl. .................... 717/173; 717/174; 709/201
(58) Field of Classification Search .......... 717/168–173; 707/203
See application file for complete search history.

(56) References Cited

U.S. PATENT DOCUMENTS

| 4,939,723 | A | * | 7/1990 | Harley et al. | 370/538 |
| 5,042,027 | A | * | 8/1991 | Takase et al. | 370/252 |
| 5,909,581 | A | * | 6/1999 | Park | 717/170 |
| 6,006,034 | A | * | 12/1999 | Heath et al. | 717/170 |
| 6,012,090 | A | * | 1/2000 | Chung et al. | 709/219 |
| 6,154,172 | A | * | 11/2000 | Piccionelli et al. | 342/357.1 |
| 6,216,175 | B1 | * | 4/2001 | Sliger et al. | 717/169 |
| 6,233,616 | B1 | * | 5/2001 | Reid | 709/225 |

(Continued)

FOREIGN PATENT DOCUMENTS
EP 703531 3/1996
(Continued)

OTHER PUBLICATIONS

Yi J. Liang et al., Real-time Voice Communication over the Internet Using Packet Path Diversity, [online], 2001 [retrieved on Feb. 9, 2012], pp. 431-440. Retrieved from the Internet <URL: http://delivery.acm.org/10.1145/510000/500205/p431-liang.pdf?>.*

(Continued)

*Primary Examiner* — Thuy Dao
*Assistant Examiner* — Hanh T Bui
(74) *Attorney, Agent, or Firm* — Lerner, David, Littenberg, Krumholz & Mentlik, LLP

(57) ABSTRACT

A user terminal obtains a version information file from a first server when activating its application software. If a version-up or updating of the existing application software is determined necessary on the basis of the version information file, the terminal obtains an update compression file corresponding to its own version of software from a second server storing the most up-to-date applications, uncompresses a compressed file so as to overwrite an existing application software therewith, and deletes unnecessary files that are not listed on the version information file.

13 Claims, 13 Drawing Sheets

U.S. PATENT DOCUMENTS

| | | | |
|---|---|---|---|
| 6,237,144 B1* | 5/2001 | Delo | 717/174 |
| 6,243,749 B1* | 6/2001 | Sitaraman et al. | 709/223 |
| 6,449,764 B1* | 9/2002 | Sliger et al. | 717/170 |
| 6,493,871 B1* | 12/2002 | McGuire et al. | 717/173 |
| 6,496,974 B1* | 12/2002 | Sliger et al. | 717/106 |
| 6,507,873 B1* | 1/2003 | Suzuki et al. | 709/245 |
| 6,567,380 B1* | 5/2003 | Chen | 370/238 |
| 6,757,740 B1* | 6/2004 | Parekh et al. | 709/245 |
| 6,925,482 B2* | 8/2005 | Gopal et al. | 709/201 |
| 6,938,109 B1* | 8/2005 | Sliger et al. | 710/68 |
| 7,383,326 B1* | 6/2008 | Himberger et al. | 709/220 |
| 7,403,978 B2* | 7/2008 | Parekh et al. | 709/217 |
| 7,451,233 B2* | 11/2008 | Parekh et al. | 709/245 |
| 7,454,523 B2* | 11/2008 | Chow et al. | 709/245 |
| 7,774,774 B1* | 8/2010 | Mulligan et al. | 717/174 |
| 7,778,969 B2* | 8/2010 | Oi | 717/173 |
| 7,844,963 B2* | 11/2010 | Pitzel et al. | 717/171 |
| 7,913,246 B2* | 3/2011 | Hammond et al. | 717/173 |
| 7,962,571 B2* | 6/2011 | Yuan et al. | 709/201 |
| 2002/0019844 A1* | 2/2002 | Kurowski et al. | 709/201 |
| 2002/0147974 A1* | 10/2002 | Wookey | 717/176 |
| 2003/0036949 A1* | 2/2003 | Kaddeche et al. | 705/14 |
| 2004/0158817 A1* | 8/2004 | Okachi et al. | 717/122 |
| 2005/0144616 A1* | 6/2005 | Hammond et al. | 717/173 |
| 2007/0233864 A1* | 10/2007 | Xie et al. | 709/226 |
| 2008/0046569 A1* | 2/2008 | DePue et al. | 709/227 |
| 2008/0244054 A1* | 10/2008 | Schomp | 709/223 |
| 2008/0320295 A1* | 12/2008 | Chong et al. | 713/2 |

FOREIGN PATENT DOCUMENTS

| | | |
|---|---|---|
| EP | 811942 | 12/1997 |
| JP | 2-263231 A | 10/1990 |
| JP | 4-347733 A | 12/1992 |
| JP | 7-028633 A | 1/1995 |
| JP | 8-263409 A | 10/1996 |
| JP | 9-091212 A | 4/1997 |
| JP | 10-021059 A | 1/1998 |
| JP | 10-21061 A | 1/1998 |
| JP | 10-301786 A | 11/1998 |
| JP | 2000-132397 A | 5/2000 |
| JP | 2000-163342 A | 6/2000 |
| JP | 2001-051838 A | 2/2001 |

OTHER PUBLICATIONS

Marios Dikaiakos, Intermediaries for the World-Wide Web Overview and Classification, [online], 2000 [retrieved on Feb. 9, 2012], pp. 1-6. Retrieved from the Internet <URL: http://www.cs.ucy.ac.cy/~mdd/publ/iscc02.pdf>.*

* cited by examiner

F I G. 1
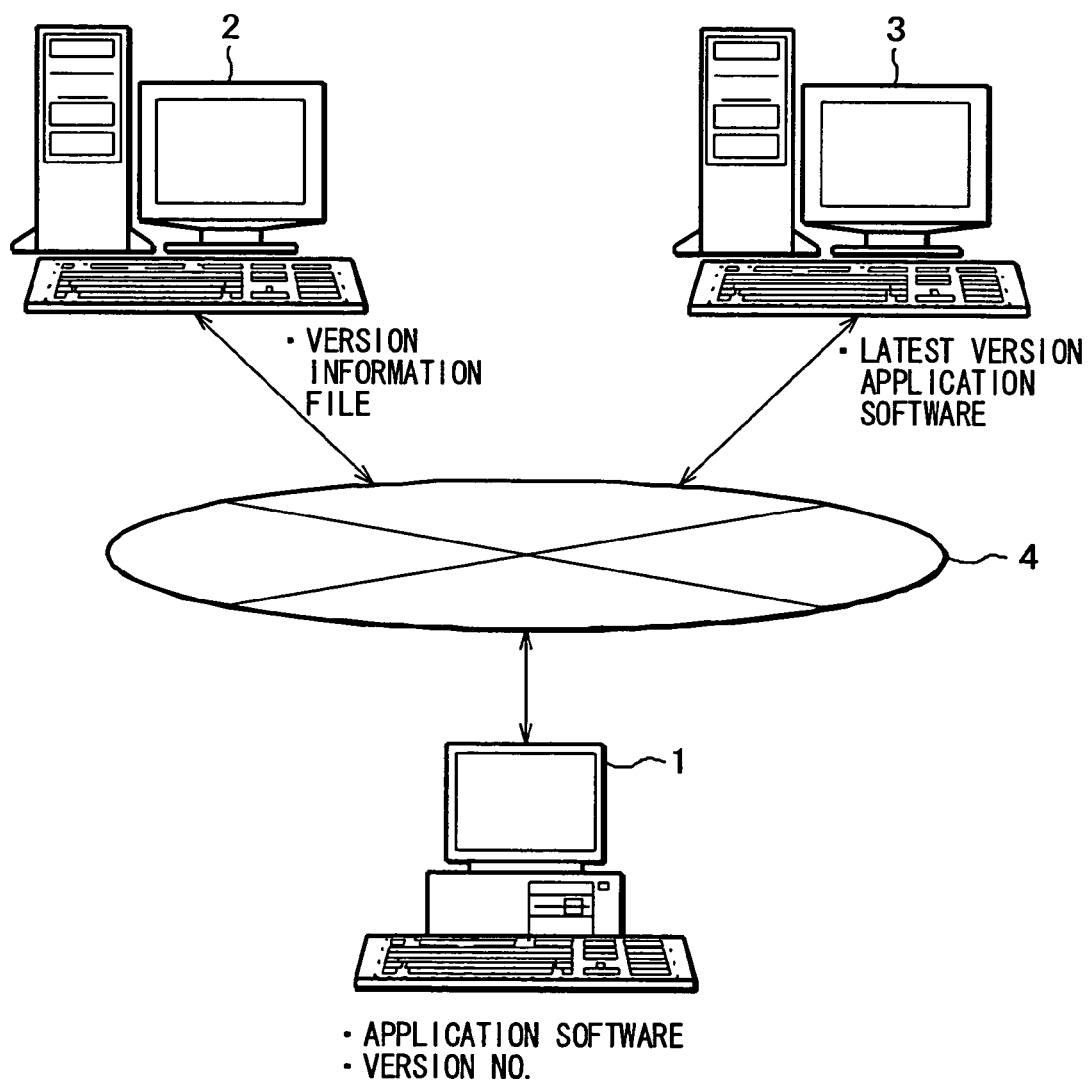

F I G. 2

- IP FOR SERVER MANAGING VERSION INFORMATION
  - NORMAL                43.13.21.12
  - TIME OVER PERIOD      43.13.21.1

- IP FOR SERVER OBTAINING LATEST APPLICATION FILE
  - IF CLIENT'S IP IS 43.15.21.** → 43.15.21.1
  - IF CLIENT'S IP IS 43.15.22.** → 43.15.22.2

- VERSION NUMBER
  - IF CLIENT'S OS IS ○○NT4.0 → 4A
  - IF CLIENT'S OS IS ○○NT3.5 → 4B
  - IF CLIENT'S OS IS ○○2000 → 4A
  - IF CLIENT'S OS IS ○○ → 4A

- NAME OF FILE NOT REQUIRED
  - IF CLIENT'S OS IS ○○NT4.0 → AAA BBB CCC DDD EEE
  - IF CLIENT'S OS IS ○○NT3.5 → BBB CCC
  - IF CLIENT'S OS IS ○○2000 → NONE

FIG. 3

- IP FOR SERVER MANAGING VERSION INFORMATION
  - NORMAL             43.13.21.12
  - TIME OVER PERIOD   43.13.21.1

- IP FOR SERVER OBTAINING LATEST APPLICATION FILE
  - IF CLIENT'S LOCATION IS IN TOKYO → 43.15.21.1
  - IF CLIENT'S LOCATION IS IN N.Y. → 43.15.22.2

- VERSION NUMBER
  - IF CLIENT'S OS IS ○○NT4.0 → 4A
  - IF CLIENT'S OS IS ○○NT3.5 → 4B
  - IF CLIENT'S OS IS ○○2000 → 4A
  - IF CLIENT'S OS IS ○○ → 4A

- NAME OF FILE NOT REQUIRED
  - IF CLIENT'S OS IS ○○NT4.0 → AAA BBB CCC DDD EEE
  - IF CLIENT'S OS IS ○○NT3.5 → BBB CCC
  - IF CLIENT'S OS IS ○○2000 → NONE

F I G. 7

| MACHINE NAME | IP ADDRESS | SUPERVISOR | LOCATION | OS | LAST UPDATE |
|---|---|---|---|---|---|
| ○○○○ | 43. 15. 21. 238 | yama | TOKYO | ○○○NT4.0 | 2002.01.23 |
| ○○○○ | 43. 15. 22. 240 | kawa | N.Y | ○○○1.5 | 2002.01.18 |
| ○○○○ | 43. 15. 21. 239 | yama | TOKYO | ○○○2000 | 2002.01.19 |
| ○○○○ | 43. 15. 21. 250 | yama | TOKYO | ○○○98 | 2001.12.23 |

F I G . 1 0
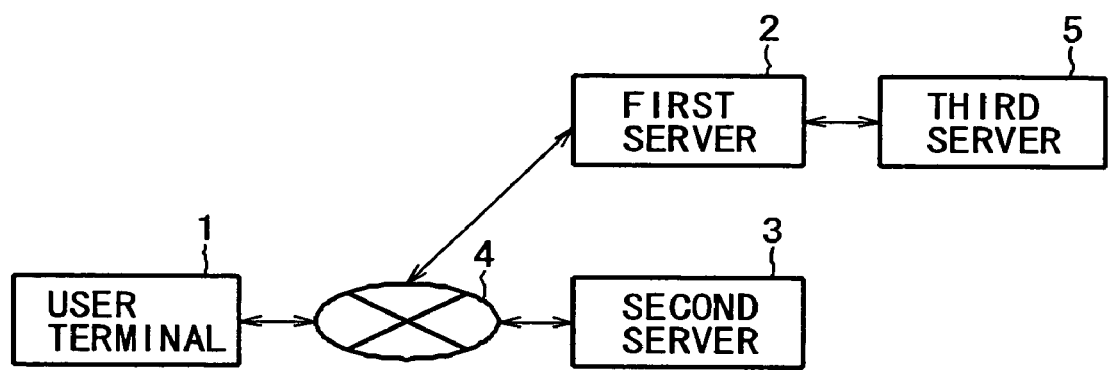

F I G. 11

| MACHINE NAME | SUPERVISOR | LOCATION | OS | LAST UPDATE |
|---|---|---|---|---|
| OOOO | yama | TOKYO | OOONT4.0 | 2002.01.23 |
| OOOO | kawa | N.Y | OOO1.5 | 2002.01.18 |
| AAAA | yama | TOKYO | OOO2000 | 2002.01.19 |
| OOOO | yama | TOKYO | OOO98 | 2001.12.23 |

FIG. 12

- IP FOR SERVER MANAGING VERSION INFORMATION
  - NORMAL          43.13.21.12
  - TIME OVER PERIOD 43.13.21.1

- IP FOR SERVER OBTAINING LATEST APPLICATION FILE ⎫ A
  - 43.15.21.1

- VERSION NUMBER
  - 4A

- NAME OF FILE NOT REQUIRED
  - NONE

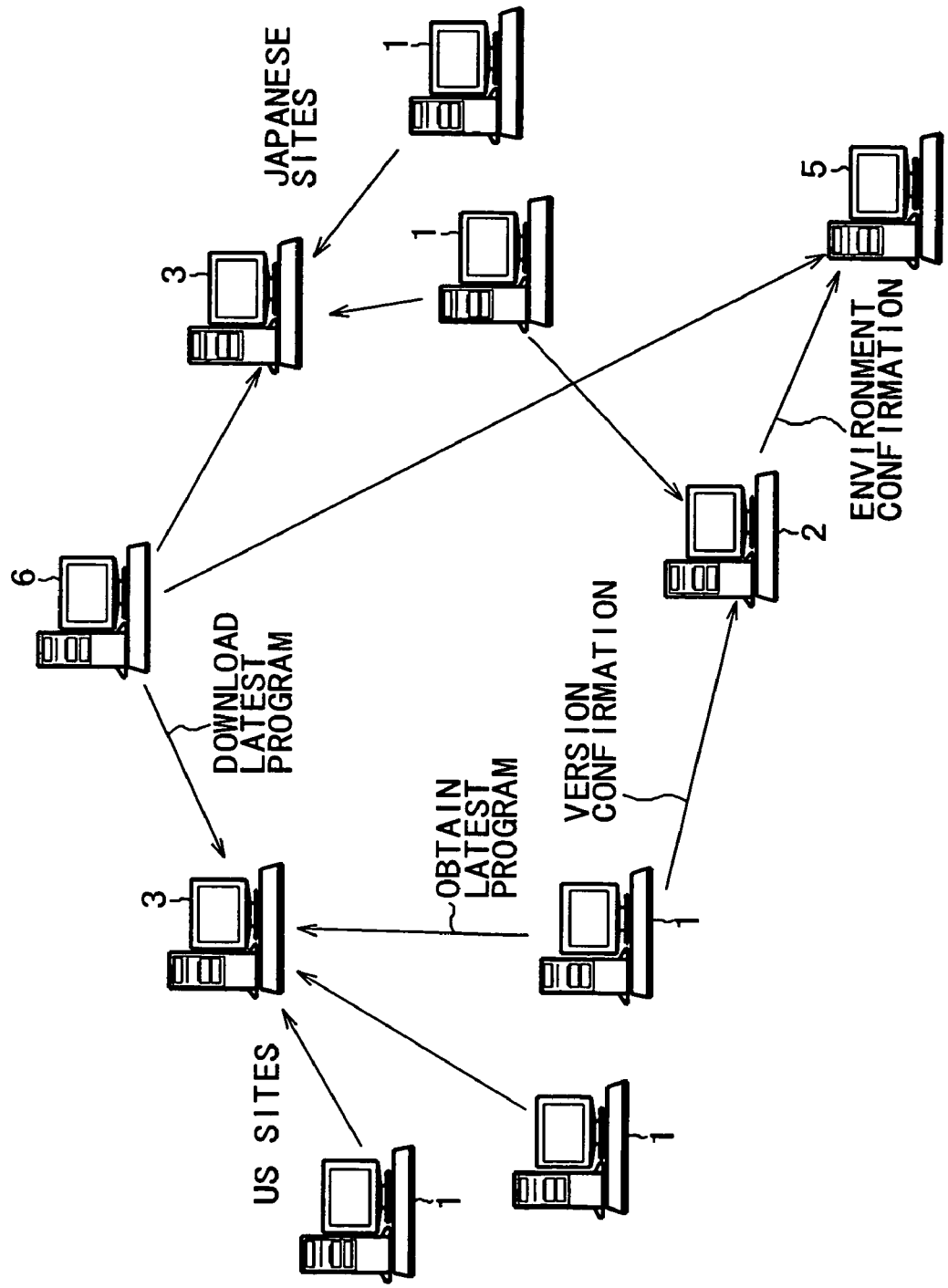

SOFTWARE UPDATING SYSTEM, SOFTWARE UPDATING METHOD, AND SOFTWARE UPDATING PROGRAM

TECHNICAL FIELD

The present invention relates to a system, a method and a program with regard to an update (version up) of software.

BACKGROUND ART

When a user conventionally used application software in a system provided with a server, there was the case where the application software was hung up during its use or did not operate at all because of the problem of interfaces unless the software was always updated to the latest application software.

Accordingly, in the above-mentioned system provided with a server, the latest version up information of application software was informed by means of a notice by mail or by means of a bulletin board in a company. Moreover, the version up of software was generally performed by manual work on an individual user terminal device by a system manager or the like.

However, there were problems in the conventional system provided with a server. The problems were that there was no means for judging the correctness of the version of software of a terminal device which a user uses except the notice by mail or the information by means of a bulletin board in a company or the like, and that the action itself of version up was also obliged to perform by hand. Consequently, when the trouble of impossibleness of the use of software was caused, confusion was often caused as to whether the software itself had the cause of the trouble or whether a network, the hardware of a main body, or the like had the cause of the trouble.

Moreover, as the method of version up, it is general to compress a file group necessary for version up to one file (which has a fixed file name), and to download the compressed file, and then to expand the downloaded file as it is with the terminal device of a user. However, by the conventional method, the files that have become unnecessary for the user terminal device by the performance of version up remain indefinitely. Consequently, there was the problem that the environment of the user terminal device became inferior. Moreover, the server as the source of the download had the problem that the server should hold the files necessary for version up indefinitely and the server had to continue the maintenance indefinitely.

Consequently, it has been desired to provide a software updating system, a software updating method, or a program for realizing the method, all of which can perform the version up work of the software of a user terminal device easily and correctly, and which can surely perform the deletion of unnecessary files generated by the version up.

DISCLOSURE OF THE INVENTION

The present invention was made in consideration of the above respects. The present invention is to provide a software updating system, a software updating method, or a program for realizing the method, all of which can perform the version up work of the software of a user terminal device easily and correctly, and which can surely perform the deletion of unnecessary files generated by the version up.

According to an embodiment of the present invention, a software updating system for performing the version up of the software used in a plurality of user terminal devices are provided. The software updating system comprises a plurality of file servers storing files for updating software stored in the user terminal device to a new version, and a version information server for storing version information for specifying the new version of the software used in the user terminal device and identification information for specifying one of the plurality of file servers storing files for updating the software to the new version. The version information server transmits the identification information of the file server storing the file used in the version up to the user terminal device when the software used in the user terminal device is not the new version, and the identification information includes information that indicates at least two or more file servers that are classified in accordance with a predetermined condition. The user terminal device receives the identification information, and selects one file server to be connected for the version-up based on the received identification information and the predetermined condition that is determined at the time of the version-up. The file server transmits the file to be used for the version up to the user terminal device when the user terminal device requests the file. Moreover, either the version information server or the file server stores a list of a file necessary for execution of the software which has been updated to the new version, and transmits the information indicating the list to the user terminal device. Incidentally, in the user terminal device, the information indicting the list is accepted and a file unnecessary for executing the new version software is deleted on the basis of the accepted information.

Incidentally, the software updating system may be configured to execute the deletion of the unnecessary file before the performance of the update to the new version.

Moreover, the software updating system may be also configured so that either the version information server or the file server stores a list of the file unnecessary for the execution of the software updated to the new version and transmits the information indicating the list to the user terminal device.

Moreover, the file server stores a plurality of files for the update to the new version according to a version of the software capable of being installed in the user terminal device and an operating environment of the user terminal device.

Incidentally, as to the file server, a reference file server for managing files related to the update unitarily may be included.

Moreover, the file server may be configured to include an environment information server for storing information pertaining to operating environments of a plurality of user terminal devices connected to the software updating system. Hereupon, when a request is transmitted from the outside, the environment information server detects the operating environment of the user terminal device to be updated to the new version to transmit the detection result to the requester, and the file server transmits the file to be used for the update to the new version corresponding to the operating environment of the user terminal device to the user terminal device according to the detection result of the environment information server.

Alternatively, when the user terminal device obtains the latest version information from the version information server, the environment information server may detect the operating environment of the user terminal device, and the update to the latest version may be performed according to the detected result.

Moreover, according to an embodiment of the present invention, a software updating method for performing version up of the software used in a plurality of user terminal devices are provided. In the present software updating method, whether the version of the software, an object of the update, which is used in the user terminal device is a new version or not is judged. When the version is not judged as the new version, the identification information, which includes information indicating two or more file servers that are classified in accordance with a predetermined condition and is identification information of the file servers that store files to be used in the version-up, is transmitted to the user terminal device, one file server to be connected during the version-up is selected based on the identification information and the predetermined condition determined at the time of the version-up, and from the selected file server, according to the version of software, a file to be used for the update to the new version according to the version of the software and list information indicating a file necessary for execution of the software after the update are transmitted to the user terminal device. Then, the user terminal device is made to execute update work and to delete a file unnecessary for execution of the software after the update.

Moreover, when the version of the software is not judged to be the new version, the method may be configured to detect the operating environment of the user terminal device, and to transmit the file for performing version up according to the detected operating environment and the version of the software used in the user terminal device.

Moreover, according to an embodiment of the present invention, a software updating program for making computers of a plurality of user terminal devices execute processing for updating software used in the user terminal devices are provided. The software updating program comprises the step of accessing a version information server storing information in advance for specifying a new version of software installed in the user terminal device, the software being an object of update, when the software is initiated, to judge whether the software of the user terminal device is the new version or not on the basis of the information for specifying the new version, the step of selecting one file server to be connected for the version-up based on information that includes information indicating two or more file servers that are classified in accordance with a predetermined condition and the predetermined condition that is determined at the time of the version-up, and the step of accessing a file server when the software is not judged to be the new version software to transmit the file to be used for the update of the software from the file server to the user terminal device, the step of updating the software of the object of the update to the new version on the basis of the transmitted file, the step of transmitting information indicating a file necessary for execution of the software updated to the new version to the user terminal device, and the step of deleting a file unnecessary for the execution of the updated software from the user terminal device by the use of the transmitted information.

Moreover, according to an embodiment of the present invention, a software updating system comprising a plurality of user terminal devices which are connected to a network and have installed predetermined software, and a plurality of file servers which are connected to the network and store files for updating the software installed in the user terminal device to the latest version software is provided. The software updating system comprises a version information server for storing identification information that is identification information for specifying one of the plurality of file servers, which stores the file for the update to the latest version software, and includes information indicating two or more file servers that are classified in accordance with a predetermined condition, and list information for indicating a list of a file name necessary for execution of the latest version software on the user terminal device.

Hereupon, the user terminal device comprises obtaining means for accessing the version information server to obtain the identification information and the list information from the version information server, and for selecting and accessing one file server to be connected at the version-up on the basis of the predetermined condition determined at the time of the version-up and the obtained identification information to obtain a file corresponding to the version of the own software from the file server through the network, updating means for updating existing software to the latest version software, and an unnecessary file deleting means for deleting a file unnecessary for execution of the latest version software on the basis of the list information obtained by the obtaining means from the version information server.

Moreover, according to an embodiment of the present invention, a software updating method in a system including a plurality of user terminal devices and a plurality of file servers, both connected to a network, is provided. In the present software updating method, files for updating software installed in the user terminal device to the latest version software is stored in the plurality of file servers, and identification information that is identification information for specifying one of the plurality of file servers, which stores the file for the update to the latest version software, and includes information indicating two or more file servers that are classified in accordance with a predetermined condition and list information indicating a list of a file name necessary for executing the latest version software on the user terminal device are stored in a version information server.

Moreover, the software updating method makes the user terminal device access the version information server to obtain the identification information and the list information from the version information server, and makes the user terminal device select one file server to be connected at the version-up on the basis of the predetermined condition determined at the time of the version-up and the obtained identification information and access the file server to obtain a file corresponding to the version of the own software from the file server through the network. Moreover, the software updating method makes the user terminal device update existing software to the latest version software on the basis of the obtained file, and makes the user terminal device delete a file unnecessary for execution of the latest version software on the basis of the list information obtained from the version information file.

Moreover, according to an embodiment of the present invention, a software updating program is provided. The program makes a computer execute the step of accessing a file server storing a file for update to the latest version software through a network, the step of obtaining a file corresponding to the version of own software from the file server, and the step of updating existing software to the latest version software on the basis of the obtained file. The software updating program is one for realizing the following processing steps.

That is, according to an embodiment of the present invention, the processing steps includes the step of accessing a version information server storing identification information that is identification information for specifying one of the plurality of file servers, which stores the file for the update to the latest version software, and includes information indicating two or more file servers that are classified in accordance with a predetermined condition through the network, the step of obtaining the identification information from the version information server, the step of selecting one file server to be connected at the version-up on the basis of the predetermined condition determined at the time of the version-up and the obtained identification information, and accessing the file server storing the file corresponding to the version of own software through the network, the step of obtaining a list of a file name necessary for executing the latest version software, and the step of deleting a file unnecessary for executing the latest version software on the basis of the list of the necessary file name.

Moreover, according to an embodiment of the present invention, a software updating system for performing version up of software used in a plurality of user terminal devices are provided. The software updating system comprises a plurality of file servers storing files for updating software stored in the user terminal devices to a new version, and a version information server storing version information that is identification information for specifying one of the plurality of file servers, which stores the file for updating the software to the new version, and includes information indicating two or more file servers that are classified in accordance with a predetermined condition. The version information server transmits the identification information to the user terminal device, makes to select on file server to be connected at the version up based on the identification information and the predetermined condition determined at the time of the version up when the software used in the user terminal device is not the new version, and the selected file server transmits the file to be used for the version up to the user terminal device when the user terminal device requests the file. Moreover, either the version information server or the file server stores a list of a file necessary for execution of the software which has been updated to the new version, and transmits the list information for specifying a file unnecessary for the user terminal device. In this case, the software updating system may be configured to execute the deletion of the unnecessary file before the performance of the update to the new version. Moreover, the software updating system may be also configured so that either the version information server or the file server stores a list of the file unnecessary for the execution of the software updated to the new version and transmits the information indicating the list to the user terminal device. Moreover, the file server may be configured to store a plurality of files for the update to the new version according to a version of the software capable of being installed in the user terminal device and an operating environment of the user terminal device. Moreover, in this case, the software updating system may be configured to further include an environment information server for storing information pertaining to operating environments of a plurality of user terminal devices connected to the software updating system.

Moreover, according to an embodiment of the present invention, a software updating method for performing version up of software used in a plurality of user terminal devices are provided. In the present software updating method, whether the version of the software, an object of the update, which is used in the user terminal device is a new version or not is judged. When the version is not judged as the new version, the identification information, which includes information indicating two or more file servers that are classified in accordance with a predetermined condition and is identification information for specifying one of the plurality of file servers that store files to be used in the version-up, is transmitted to the user terminal device, and from the selected file server, according to the version of software, a file to be used for the update to the new version according to the version of the software and list information indicating a file necessary for execution of the software after the update are transmitted to the user terminal device for making it possible to specify and delete a file unnecessary for the user terminal device.

Moreover, according to an embodiment of the present invention, a software updating program for making computers of a plurality of user terminal devices execute processing for updating software used in the user terminal devices is provided. The software updating program comprises the step of accessing a version information server storing information in advance for specifying a new version of software installed in the user terminal device, the software being an object of update, when the software is initiated to judge whether the software of the user terminal device is the new version or not on the basis of the information for specifying the new version, the step of accessing a version information server and making transmit identification information including information indicating two or more file servers that are classified in accordance with a predetermined condition, and the step of selecting on file server to be connected at the version up based on the identification information and the predetermined condition that is determined at the time of the version-up, and the step of accessing the file server when the software is not judged to be the new version software so as to transmit the file to be used for the update of the software from the file server to the user terminal device, the step of updating the software of the object of the update to the new version on the basis of the transmitted file, the step of transmitting information indicating a file necessary for execution of the software updated to the new version to the user terminal device, and the step of specifying a file unnecessary for the execution of the updated software in the user terminal device by the use of the transmitted information to inform the specified file to the user terminal device for making it possible to delete the file.

BRIEF DESCRIPTION OF DRAWINGS

FIG. 1 is a block diagram showing the configuration of a server/client system being a software updating system according to a first embodiment of the present invention;

FIG. 2 is a chart showing the contents of a version information file in the server/client system of FIG. 1;

FIG. 3 is a chart showing the contents of another example of the version information file applicable to the server/client system of FIG. 1;

FIG. 7 is a chart showing the contents of information held by an environment server in the server/client system of FIG. 6;

FIG. 10 is a block diagram showing a software updating system according to a third embodiment of the present invention;

FIG. 11 is a chart showing the contents of information held by an environment server in the server/client system of FIG. 10;

FIG. 12 is a chart showing a version information file in the server/client system of FIG. 10;

FIG. 14 is a view showing a software updating system according to a still further embodiment of the present invention in comparison with FIG. 10.

BEST MODE FOR CARRYING OUT THE INVENTION

Figure 4:
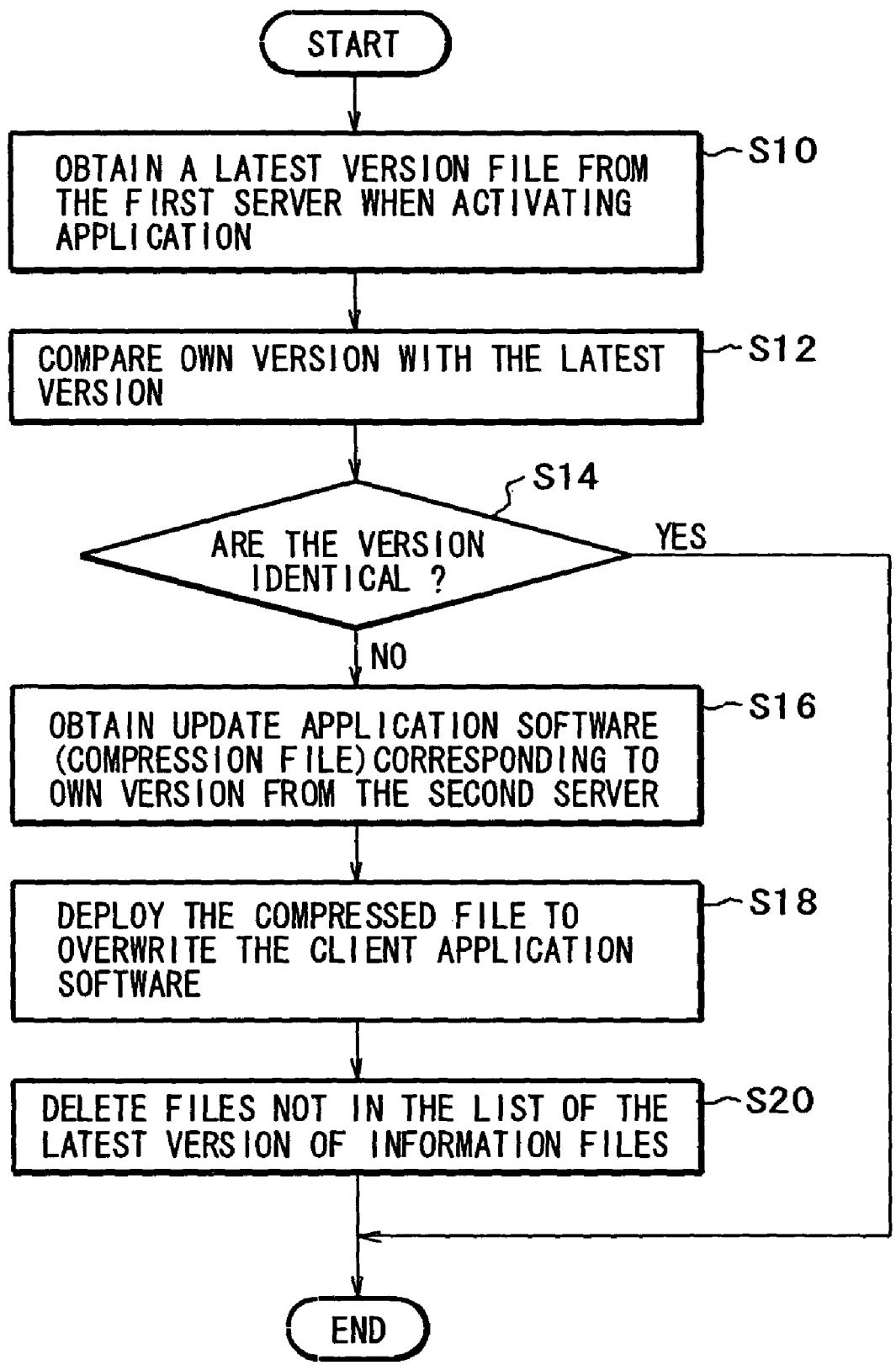
FIG. 4 is a flowchart for illustrating the operation of the server/client system of FIG. 1.

In the following, the attached drawings will be referred while the preferred embodiments of the present invention are described.

(1-1) Configuration of a First Embodiment

FIG. 1 is a block diagram showing the configuration of a server system to which a software updating system according to a first embodiment of the present invention is applied. In the figure, a client terminal 1 is a user terminal being a computer of a client in this system. The client terminal 1 includes various kinds of installed application software according to objects. The client terminal 1 holds a file in which the information related to the version (version number) of application software owned by the client terminal 1 itself.

A first server 2 holds a version information file describing the information concerning the version number of the latest application software. The version number is the information for judging the oldness or the newness itself of the application software. To be more specific, the version information file includes the IP address of the server 2 (hereinafter referred to as the first server) for managing the version information of application software, which IP address is the identification information for specifying the first server 2, the IP address of a server 3 (hereinafter referred to as a second server) for taking in the latest application software, which IP address is the identification information for specifying the second server 3, a version number, and a list of a file name necessary on the client.

FIG. 2 is a chart showing an example of this version information file. FIG. 2 shows the case where the client terminal 1 is identified by means of the client IP, the identification information of the client terminal 1, and a series of processing, which will be described later, is executed. In this example, IP addresses at the time of a normal time and the time of a time over time are recorded as the IP addresses of the first server 2. Moreover, the IP address of the second server 3 is assigned to every client terminal 1 as the IP address of the second server 3. Moreover, a version number is set every version of an operating system, and unnecessary file names ("AAA", "BBB" and the like) are recorded to every version of the operating system.

Incidentally, it is also possible to judge the environment of the client terminal 1 on the basis of the information specifying the equipment of the client terminal 1 to execute a series of processing, which will be described later. In this case, a version information file can be composed as shown in FIG. 3. Incidentally, the example shown in FIG. 3 assigns the IP address of the second server 3 according to the location of the client terminal 1 which is detected at the time of logging in.

The second server 3 holds a plurality of compressed files of the latest application software according to the versions of the application software in the client terminal 1.

Incidentally, the above-mentioned client terminal 1, the first server 2 and the second server 3 are connected to each other through a network 4 such as an intranet, the Internet or the like. Moreover, the second server 3 is provided only one in the example shown in FIG. 1, but a plurality of servers may be used according to the number of the pieces of application software or the capacity thereof. Incidentally, in this case, which application software (compressed file) resides in each server is recognized on the basis of "IP address of server for taking in latest application file", indicating the IP address of the second server 3, in the version information file held by the first server 2, which is described above in connection with FIGS. 2 and 3.

(1-2) Operation of the First Embodiment

Next, the operation of the software updating system according to the above-mentioned embodiment is described. Hereupon, FIG. 4 is a flowchart for illustrating the operation of the present embodiment.

First, when the client terminal 1 initiates application software, the client terminal 1 obtains a version information file from the first server 2 in accordance with File Transfer Protocol (FTP) or the like (step S10). Next, the client terminal 1 compares the version number in the version information file obtained from the first server 2 with the version number on the client side (step S12). Then, the client terminal 1 judges whether both the version numbers are the same or not (step S14). When the version numbers are the same, the client terminal 1 does not perform the version up of the application software.

On the other hand, when the version numbers are not the same, it is necessary to perform the version up. Accordingly, the client terminal 1 obtains a compressed file fitted to the client terminal's own version from the second server 3 holding the latest application software in accordance with FTP or the like (step S16). At this time, it is also advantages that the second server 3 is replaced to every user terminal in accordance with the condition described in the version information file or the selection performed at random to evade the concentration of loads to a specific server for dispersing the loads of the network.

Next, the client terminal 1 expands the obtained compressed file to overwrite existing application software (step S18). Then, the client terminal 1 deletes files that are not listed in the list of the version information file (step S20).

Incidentally, in this case, the client terminal 1 is needed to obtain the compressed file of the version corresponding to the own version from the second server 3 when the client terminal 1 performs the version up of the application software. The following method is considerable for obtaining the compressed file corresponding to the own version.

The second server 3 supposes that the versions of the pieces of application software in the client terminal 1 exist in a wide range. Accordingly, the second server 3 holds a file group (the file name is one in accordance with a fixed rule) made by compressing differential files to every version. For example, when the application software having the name of "Rev *" in the client terminal 1 is changed to the latest version, the compressed file having the name of "Rev *" may be obtained to be expanded on the client terminal 1, and then unnecessary files which are not listed in the version information file may be deleted.

To be more specific, it is supposed that the version number of the latest application software is "4". When the version number in the client terminal 1 is "1" the client terminal 1 may obtain the compressed file of "1" from the second server 3 to expand the obtained compressed file. Then, by deleting unnecessary files, the version number changes to the latest version number, "4". Moreover, when the version number in the client terminal 1 is "2", the client terminal 1 obtains the compressed file of "2" from the second server 3 to expand it. Then, by deleting unnecessary files, the version number changes to the latest one, "4".

Incidentally, like in this embodiment, the latest application software (compressed file) is downloaded, and the compressed file is next expanded. After that, unnecessary files may be deleted. But the updating method is not limited to the method mentioned above. The latest application software (compressed file) is downloaded, and then unnecessary files are deleted. After that, the compressed file may be expanded. The procedure aims to prevent the hanging up (halt) of the client terminal 1 because the expanded file is too large when the compressed file is expanded.

Figure 5:
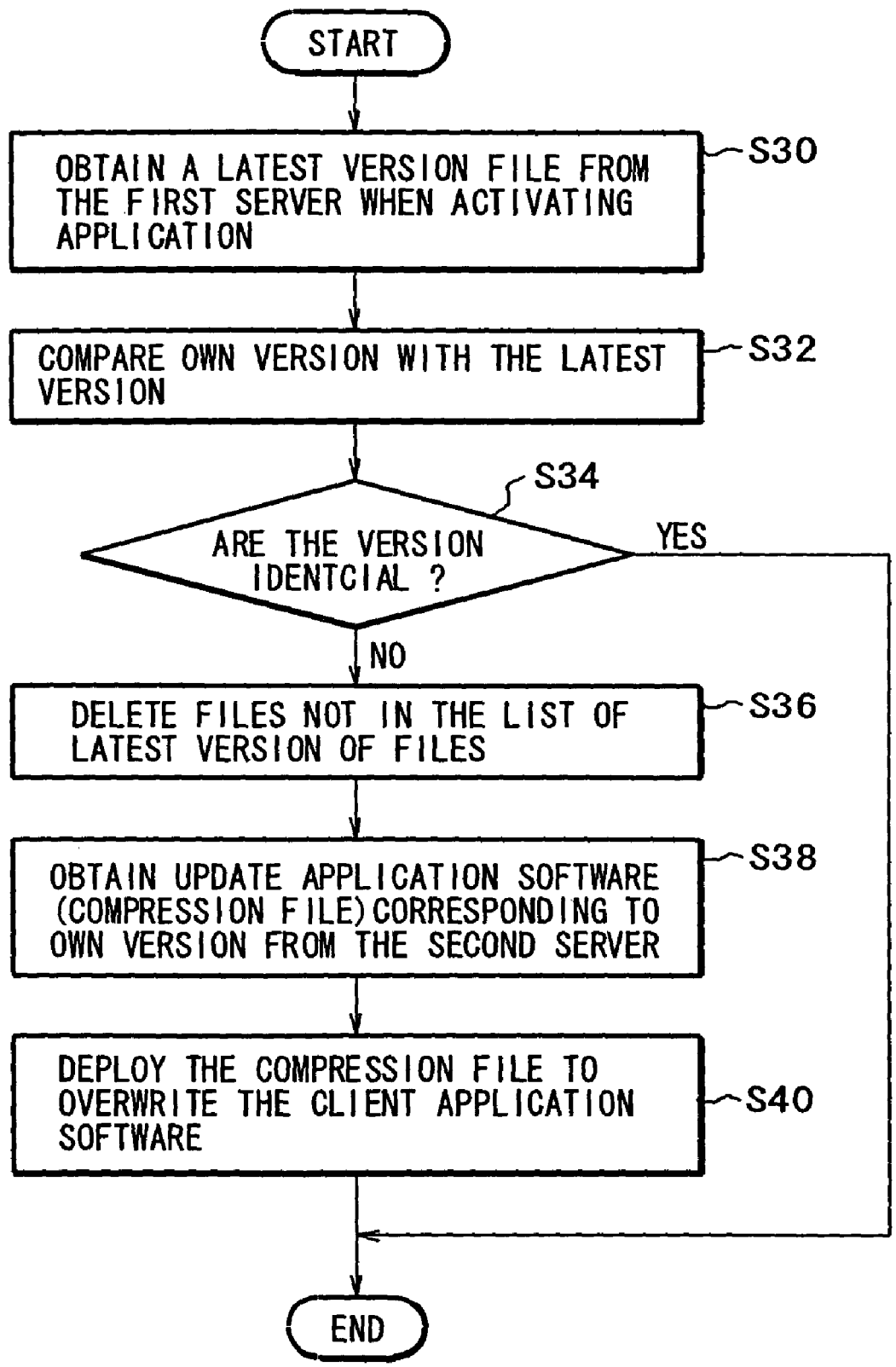
FIG. 5 is a flowchart for illustrating another example of deletion of an unnecessary file which example is applicable to the server/client system of FIG. 1.

FIG. 5 is a flowchart for illustrating the operation of updating application software in the order of downloading a compressed file, deleting unnecessary files and expanding the compressed file as described above. That is, in FIG. 5, the order of the step S30, S32 and S34 are the same as the order of the steps S10, S12 and S14. However, when the version numbers are not the same, first, files not listed in the list of the version information file are deleted (step S36), then the client terminal 1 obtains a compressed file fitted to the client terminal's own version from the second server 3 holding the latest application software in accordance with FTP or the like (step S38). After that, the client terminal 1 expands the obtained compressed file to overwrite existing application software (step S40). By deleting the unnecessary files before the expansion in such a way, it is possible to prevent the hanging up (halt) of the client terminal 1 because the expanded file is too large.

Moreover, in this embodiment, the version information file held by the first server 2 includes a file name list necessary at the time of execution of the latest application on the client, and the unnecessary files are deleted in accordance with the list of the necessary files. However, the version information file may include an unnecessary file name list, and the unnecessary files may be deleted in accordance with the list of the unnecessary files.

As described above, the second server 3 constitutes the file server storing files for updating the software stored in the client terminal 1, a user terminal device, to a new version. In contrast to this, the first server 2 is made to constitute the version information server for storing the version information for specifying the new version of the software used in the user terminal device and the identification information for specifying a corresponding file server.

(1-3) Effect of the First Embodiment

According to the configuration described above, it is possible to perform the version up of application software without the recognition of the version of the application software on the client side, which has not been used for a long term (without performance of version up).

That is, the user of the client terminal 1 can use the client terminal 1 without recognizing whether the application software is the latest software or not.

Moreover, because the user can use the client terminal 1 on the supposition that the application software is the latest software, there is a merit in which it can be easily guessed that, when the software cannot be used, the cause resides in the network or the hardware of the main body.

Moreover, even if the location of the server holding the latest application software itself or the compressed file thereof has changed, the operation of version up is not hindered by obtaining the version information file.

Moreover, if the client terminal 1 obtains the compressed files composed of only necessary differential files, the load of the network can be suppressed to the minimum.

Further, because files unnecessary for the latest application software are automatically deleted, the deterioration of the environment of the client terminal 1 can be prevented.

(2-1) Configuration of the Second Embodiment

Figure 6:
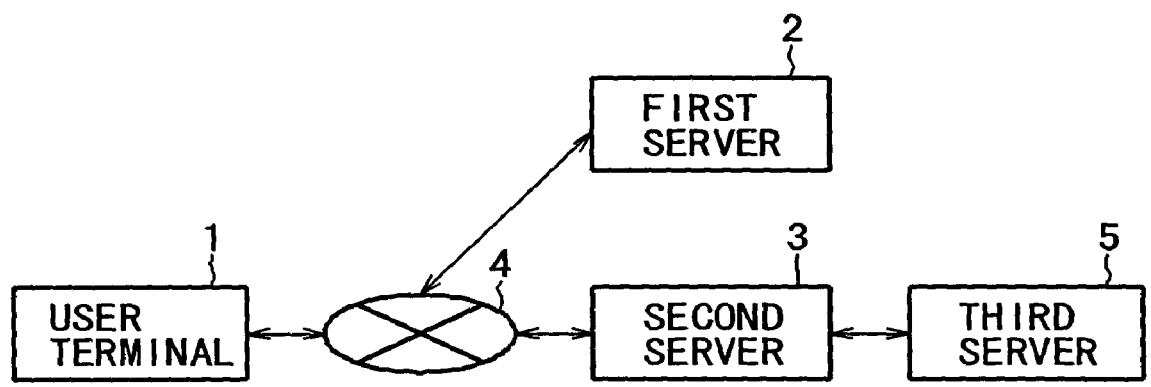
FIG. 6 is a block diagram showing a software updating system according to a second embodiment of the present invention.

FIG. 6 is referred while an example of the system configuration of a second embodiment of the present invention is described. The system to which the software updating method of the present embodiment is applied, for example as shown in FIG. 6, comprises a user terminal 1 which stores application software being an object of update and is used by a user for executing the software, a first server 2, a second server 3 and a third server 5 which are used for realizing an update of the software, and a network 4 connecting these servers with the user terminal 1. Incidentally, the servers and the like in FIG. 6 are designated by the same reference numerals as the corresponding components described above in connection with FIG. 1. Moreover, in the following descriptions, the descriptions of components common with those in the first embodiment are omitted, and only the different components will be described.

The user terminal 1 is composed of, for example, a computer equipped with a CPU, a memory and a network connection section, and application software and the information concerning the version thereof.

The first, the second and the third servers 2, 3 and 5 are severally supposed to be composed of, for example, a computer equipped with a CPU and a memory. In particular, the first and the second servers are supposed to have a network connection section for enabling the connection with the user terminal 1 through the network 4.

The first server 2 holds a version information file defining the information concerning the latest version of the application software to be updated, and the like. The version information file includes, for example, the IP address of a server managing the version information of application software (the first server 2 in this case), the IP address of a server for taking in the latest application (the second server 3 in this case), the identification number of the latest version, and the like.

The second server 3 holds a plurality of kinds of program files for the version up of the application software to be the object of update or the compressed files of the program files for being capable of corresponding to various versions owned by the user terminals 1 and various operating systems (OSs) used by the user terminals 1. Incidentally, in the present embodiment, only single second server 3 is shown, but the system may be configured to be provided with a plurality of the second servers 3. In this case, as described above in connection with the first embodiment, the system may be configured so that distribution is performed on the basis of the IP addresses of the user terminals 1, and that the second servers 3 are assigned by sections to which the user terminals 1 belong or the second servers 3 are assigned to every zone in which the user terminal 1 is disposed. Also, the system may be configured so that an upper rank reference file server appropriately transmits a program file or the compressed file thereof for version up to the servers 3 and the same ones are prepared to the servers 3 even if there is a plurality of servers 3.

The third server 5 is a server for managing the information related to a plurality of user terminals that have been registered in advance. The server 5 possesses environment information file related to the operating environment of the user terminal 1 such as the IP address of the user terminal 1, a manager, possessed application software, used OS and the like, the information of the latest updated date and hour, and the like. Incidentally, in FIG. 6, only one user terminal 1 is exemplified, but the system may be configured to include a plurality of the user terminals 1.

FIG. 7 is a chart showing an example of the information held by the third server 5. In this example, the information is composed of the machine names of the user terminals 1, their IP addresses, their managers, their locations specified by logging in, their operation systems and the information of the latest update dates. Incidentally, as described above in connection with the first embodiment, when the information specifies a user terminal 1, various kinds of information capable of specifying the user terminal 1 can be applied. For example, as shown in FIG. 11, the information of the locations specified by logging in may be used in place of the IP addresses of the user terminals 1. In addition, unique terminal names and unique user names may be widely applicable. Incidentally, the latest update dates are necessary in case of judging whether a file for version up on the second server 3 is still necessary or not.

(2-2) Operation of the Second Embodiment

In the system of the present embodiment, processing is roughly performed as described in the following.

(1) Confirming whether the version of the application software, an object of update, used in the user terminal 1 is the latest software or not.

(2) Detecting the operating environment of the user terminal 1 in case of judging that the version is not the latest one, and transmitting a file or a file group for version up to the user terminal 1 according to the detected operating environment and the version of the application software used in the user terminal 1.

(3) Transmitting list information indicating a file necessary for execution of the application software updated by the version up (or a file unnecessary for the execution) when the version of the application software is not judged the latest one.

(4) Executing version up in the user terminal 1, and deleting files unnecessary for the execution of the application software the version up of which has been executed.

The processing in the user terminal 1 among the processing may have the configuration which is realized by transmitting a program from a server to the user terminal 1 to execute the transmitted program in the user terminal 1. Alternatively, the processing may have the configuration realized by adding a predetermined program in advance to the application software which is an object of update and is installed in the user terminal 1 to execute the predetermined program in accordance with a control signal transmitted from the server or user's operations.

Figure 8:
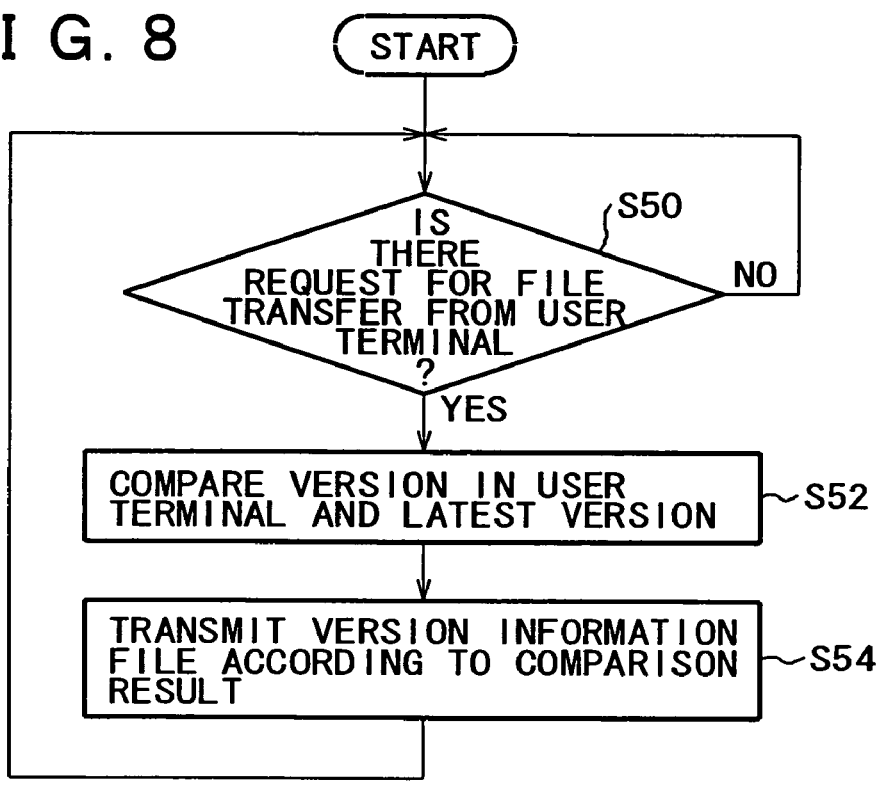
FIG. 8 is a flowchart for illustrating the operation of a first server in the server/client system of FIG. 6.
Figure 9:
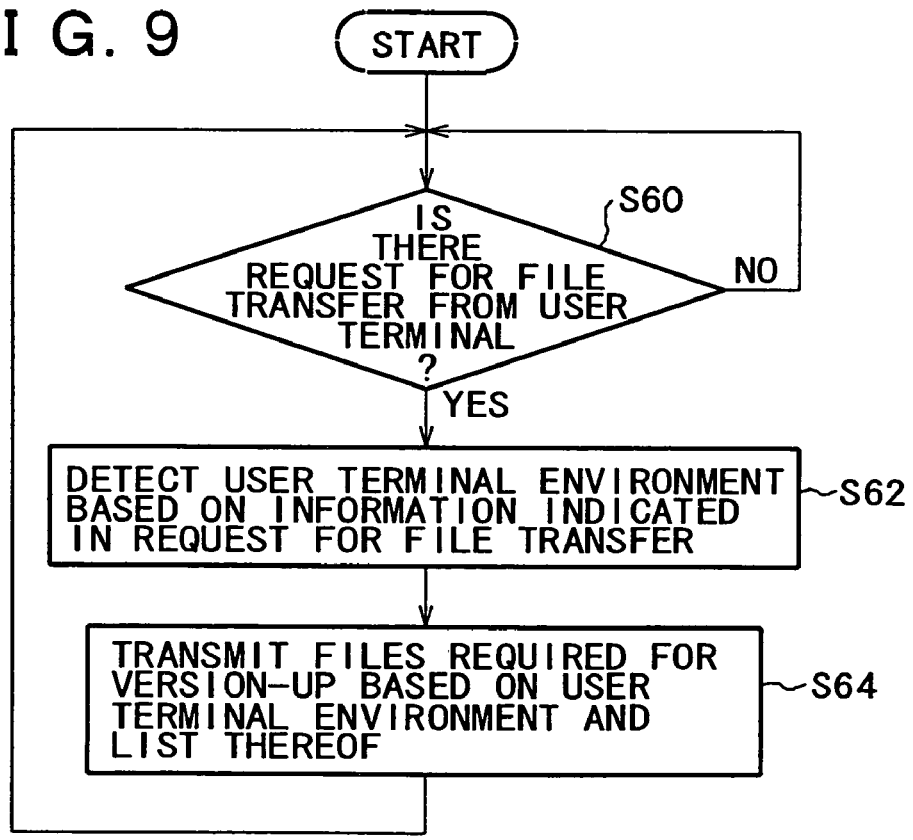
FIG. 9 is a flowchart for illustrating the operation of a second server in the server/client system of FIG. 6.

An example of the operation of the system of the present embodiment will be concretely described by the use of the flowcharts of FIGS. 8 and 9.

First, the system detects whether the version of the application software to be updated is the latest one or not. The program realizing the detection processing and the processing executed in the user terminal 1, which will be described in the following, may be included in the application software to be updated itself, or may be configured to be prepared in the system side of the user terminal 1 together with the application software.

In the user terminal 1, when the application software to be updated is initiated, the user terminal 1 is connected to the first server 2 by means of the network connection section of the user terminal 1. The user terminal 1 transmits a file transfer request to the first server 2 together with the version information of the application software, an object of update, being used at this point of time. The user terminal 1 obtains a version information file pertaining to the application software.

The first server 2 receives the file transfer request from the user terminal 1, and as shown in FIG. 8, judges whether the version of the application software used in the user terminal 1 is the latest one or not (steps S50, S52 and S54). The first server 2 transmits a version information file corresponding to the judgment result to the user terminal 1 (step S54). Hereupon, when the first server 2 judges that the version of the application software of the user terminal 1 is not the latest one, the first server 2 makes the user terminal 1 display a message indicating the result, and further transmits a program for realizing the processing for controlling the user terminal 1 in order that the user terminal 1 may accept the user operations for instructing the execution of version up.

Incidentally, the system may adopt the configuration in which the judgment of whether the version is the latest one or not is performed by the user terminal 1 in place of the first server 2. In this case, the first server 2 transmits the information indicating the latest version to the user terminal 1 together with the version information, and then the user terminal 1 judges whether the application software used in the user terminal 1 is the latest one or not.

The version information file includes a program realizing or initiating the processing of accessing the second server 3 to obtain a file for performing the version up defined in the version information file when the user terminal 1 accepts the user operations instructing the version up. When the program is initiated in the user terminal 1 by the operations of the user, the program controls the user terminal 1 to transmit a file transfer request for obtaining necessary files for the version up to the second server 3, and to accept the file for performing the version up to display a message indicating the acceptance of the file. The program further controls the user terminal 1 to accept the instructions from the user whether to initiate the accepted file for performing the version up or not.

When a request for transferring a file by, for example, FTP or HTTP is transmitted from the user terminal 1, the second server 3, as shown in FIG. 9, detects the operating environment of the user terminal 1 (steps S60 and S62). The second server 3 retrieves the environment information file pertaining to the operating environment of the user terminal 1 possessed by the third server 5 by the use of, for example, the IP address being the identification information of the user terminal 1, which is indicated by the transmitted file transfer request, or the like as a key, and the second server 3 detects the operating environment of the user terminal 1 such as the OS used in the user terminal 1, or the like (step S62).

Furthermore, the second server 3 transmits a file group or the compressed file thereof for performing the version up fitted to the detected operating environment of the user terminal 1 to the user terminal 1 (step S64).

When the second server 3 transmits the file, the second server 3 transmits the file to the user terminal 1 together with the information indicating the list of the files necessary or unnecessary for the execution of the application software the version up of which has been performed. The user terminal 1 can delete the unnecessary files by means of the transmitted list information. It is needless to say that the system may be configured so that the user terminal 1 obtains the list of the file names necessary for updating the software from the first server 2 to delete the unnecessary files in advance on the basis of the obtained list before the performance of the version up as in the first embodiment.

When the user terminal 1 accepts the user operations instructing the execution of the version up, the user terminal 1 executes the version up. Hereupon, if the accepted file is a compressed file, the user terminal 1 executes the version up after expanding the compressed file.

(2-3) Effects of the Second Embodiment

According to the configuration described above, in the second embodiment, the update of the application software is executed simply and surely as occasion demands according to the operating environment of the user terminal 1, and unnecessary files can be deleted simply and surely.

(3) Third Embodiment

In the present embodiment, as shown in FIG. 10, the third server 5 is connected to the first server 2. By the connection, in this embodiment, the first server 2 obtains the environment information of the user terminal 1 from the third server 5, and the first server 2 updates the contents of the version information files on the basis of the environment information. Hereupon, the third server 5 holds the operating environment files of the same kinds as those of the third server 5 in the second embodiment.

FIG. 11 is a chart showing the contents of an operation environment file held by the third server 5 in the configuration. In this example, the user terminal 1 is specified on the basis of the location information specified by logging in.

In this embodiment, processing is roughly performed as described in the following.

(1) Accessing the first server 2 in accordance with FTP or the like for confirming whether the version of the application software, an object of update, being used in the user terminal 1 is the latest one or not. Detecting the IP address of the user terminal 1 by means of the first server 2 at the time of accessing in conformity with FTP, and obtaining the information related to the environment of the user terminal 1 (location, OS information, latest update day and the like) from the third server 5 having the environment information on the basis of the IP address information. Generating a version information file corresponding to the user terminal (IP address of the first server 2, IP address of the second server 3, version number, necessary or unnecessary file name list, and the like). Obtaining the file by means of the user terminal 1. Incidentally, because there is the case where a plurality of user terminals 1 accesses simultaneously, the file to be generated is given a unique name corresponding to the user terminal or is generated in a unique folder. Moreover, the file may be generated before the user terminal 1 accesses to the first server 2.

(2) Comparing the latest version described in the file with the version of the application on the user terminal 1 by means of the user terminal 1.

(3) Obtaining a file or a file group for version up from the second server 3 described in the version information file by means of the user terminal 1 for taking in the latest application file described in the file in case of judging that the version of the application is not the latest one. Changing the information pertaining to the update date of the third server 5 to the obtainment completion date by means of the second server 3 by regarding as the completion of the version up of the user terminal 1 at the time of the completion of the obtainment.

(4) Executing the version up by expanding the obtained file and the file group on the user terminal 1, and deleting unnecessary files described in the version information file.

(5) Deleting files or file groups necessary for the version up which become unnecessary to be held from the reference file server and each server by means of the third server 5 managing the information of the latest update date of the user terminal 1 after examining the situation of the processing of the version up to every OS information at every time of rewriting the information of the latest update data of the user terminal 1.

FIG. 12 is a chart showing an example of a version information file in the first server 2. In the version information file, the items designated by a reference mark A are generated by the first server 2 on the basis of the information obtained form the third server 5. Incidentally, FIG. 12 is an example of the machine named as AAA shown in FIG. 11.

Incidentally, the processing in the user terminal 1 in these pieces of processing may be configured to be realized by transmitting a program from the server to the user terminal 1 for executing the transmitted program in the user terminal 1. Alternatively, the processing may have the configuration realized by adding a predetermined program in advance to the application software which is an object of update and is installed in the user terminal 1 to execute the predetermined program according to the control signal transmitted from the server or user operations. By the processing described above, the update of the application software is executed surely as occasion demands according to the operating environment of the user terminal 1.

By the configuration of this embodiment also, the similar effects to those of the first embodiment can be obtained.

(4) Other Embodiments

Incidentally, the embodiments described above adopt the configuration in which user's operations are accepted with respect to the necessity of version up and the execution of version up, the present invention is not limited to the configuration. For example, the system of the present invention may adopt the configuration in which, when the version of application software to be updated is not the latest one, the version is automatically updated without accepting user's operations.

Moreover, as to the third server 5 in the above-mentioned embodiments, the system of the invention may adopt the configuration in which the third server 5 manages the update situations of software in addition to storing the environment information files. For example, the system is configured to hold the version information of the application software in a plurality of user terminals 1, which are registered in advance, and the information pertaining to the update work of the application software by the third server 5. Moreover, the system is configured to transmit the result of sending work to the third server 5 when the second server 3 sends the application software to the user terminal 1 for update. By means of these configurations, the situations of the update of each user terminal 1 can be grasp.

Moreover, the system may adopt the following configuration. That is, whether the update of a certain specific application software has terminated in all of the registered user terminals or not is detected by means of the above-mentioned means for grasping the situations of the updates of the user terminal 1. The result of the detection is informed to the second server 3. The second server 3 deletes all of the files related to the application software that has become unnecessary. By means of this configuration, the file became unnecessary can be deleted appropriately. Consequently, the second server 3 can be used more efficiently.

Moreover, when the third server 5 manages the update work of the application software in the previously registered user terminal 1, it is checked that the application software which is not originally the object of update or an unregistered user has accessed or not. Thereby, it becomes possible to prevent illegal update work.

Moreover, in the above-mentioned embodiments, the case where the third server 5 is directly connected to the first or the second server 2 or 3 is described. The present invention is not limited to the configuration. The present invention may adopt the configuration in which the connection between the first or the second server 2 or 3 and the third server 5 is made through the network 4.

Figure 13:
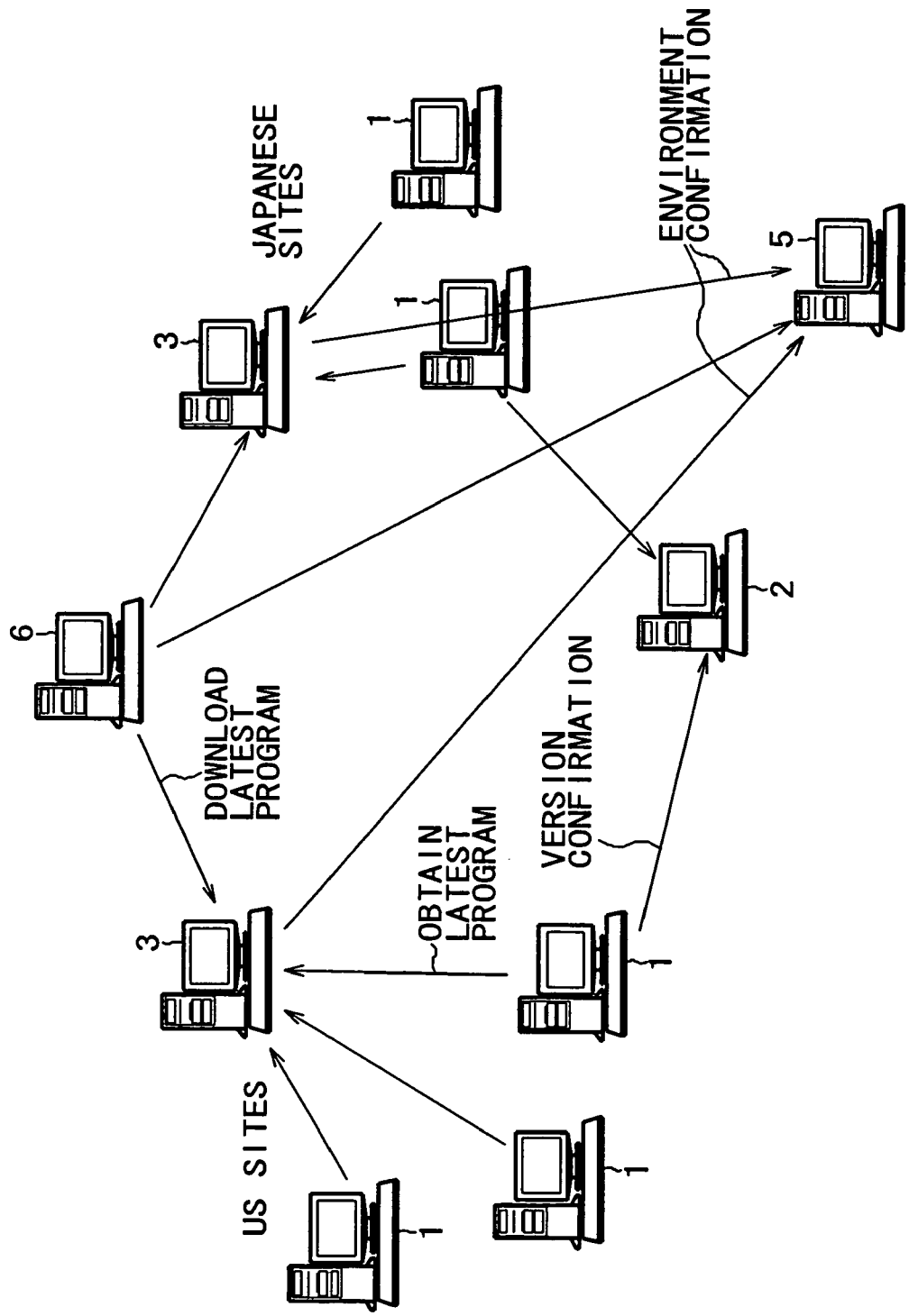
FIG. 13 is a view showing a software updating system according to a further embodiment of the present invention in comparison with FIG. 6.

Moreover, in the above-mentioned embodiment, the case where the first and the second servers are composed of one computer or a plurality of computers connected through a network is described. However, the present invention is not limited to the configuration. As shown in FIG. 13 and FIG. 14 in comparison with FIG. 6 and FIG. 10, respectively, a reference server may be provided for performing the uniform management of the files to be updated that are held by the plural computers. Incidentally, even if all of the first, the second and the third servers 2, 3 and 5 and the file reference server are implemented on the same hardware, it does not cause any problems.

Moreover, the user terminals 1 in the above-mentioned embodiments are not particularly limited as long as they are computer apparatus equipped with connection functions to networks. For example, they may be game machines, information terminals such as PDA, or the like. In particular, the present invention achieves a great effect in the user terminal 1 for executing the application software related to accounting, travel expense clearing, labor management and the like which are used in business. That is, because the updating work of the business application software is mainly performed during business hours, and because it is required to complete at every predetermined end as a unit such as the end of a month, the beginning of a month and the like, the loads to a network and a server incline to concentrate to a specific period or a specific time zone. Moreover, because the application software is the software to be used in business, it is needed to be downloaded instantaneously and surely. Even in such a situation, the software updating system of the above-mentioned embodiment can perform updating work more easily and more accurately however comprehensively the application software is used.

Moreover, when a game machine equipped with a network connecting function is used as a user terminal, the software updating system may be configured to judge the version of application software after the termination of a certain program to perform update or the sending of new application software as the occasion demands. In case of a program of a role playing game having an attribute of a long story, a new scenario is downloaded at the time of the termination of a fixed scenario. Thereby, the load of the game machine is decreased, and it becomes possible to prevent the analysis of the future of a scenario by analyzing the game machine arbitrarily. Moreover, it also becomes possible to guess the degree of the progress of a user on the basis of the situation of downloading.

Moreover, in the above-mentioned embodiments, the case where a server and a user terminal are specified by the identification information based on an IP address, but the present invention is not limited to such a case. Identification information for specifying various kinds of equipment directly or indirectly on a network can be widely applied.

As described above, according to the present invention, the version up work of the software of a client terminal can be performed easily and accurately. Moreover, it is possible to provide a software updating system, a software updating method, both capable of deleting unnecessary files generated by version up, and a program realizing the method.

INDUSTRIAL APPLICABILITY

The present invention relates to software updating system, software updating method, and a software updating program, and can be applied to the provision of various programs on a network.

The invention claimed is:

1. A software updating method for performing of software used in a user terminal device, the method comprising:
determining at the user terminal, by referring to a version information server, whether a version of the software that is used in the user terminal device is a new version;
storing information pertaining to operating systems of a plurality of user terminal devices;
detecting an operating system of the user terminal device to be updated;
sending from a file server to the user terminal a file to be used for updating to the new version according to the detected operating system of the user terminal device, the version of the software and list information indicating files necessary for execution of the software after the update to the user terminal device when the version is determined not to be the new version, the file server being determined based on a location of the user terminal device; and
executing, in the user terminal device, update work and deletion of files unnecessary for execution of the software after the update, the files to be deleted being determined based on the list;
wherein the file to be used for the updating is a compressed differential file specifying the differences between the software used in the user terminal and the new version, and
the compressed differential file is expanded at the user terminal only after all unnecessary files are deleted from the user terminal.

2. A software updating method, comprising:
a step of a user terminal accessing a version information server that is not part of the user terminal, the version information server storing information in advance for specifying a new version of software installed in the user terminal device, the software being an object of updating, when the software is initiated, to determine whether the software installed in the user terminal device is the new version based on the information for specifying the new version;
a step of accessing a file server storing a file for updating the software when the software is judged not to be the new version software to transmit the file to be used for the update of the software from the file server to the user terminal device, the file server being determined based on a location of the user terminal device;
a step of accessing an environment information server that stores information pertaining to operating systems of a plurality of user terminal devices, the environment information server detecting an operating system of the user terminal device;
a step of updating the software installed in the user terminal device to the new version based on the transmitted file and the detected operating system of the user terminal device;
a step of transmitting information indicating a file necessary for execution of the software updated to the new version to the user terminal device; and
a step of deleting a file unnecessary for the execution of the updated software from the user terminal device by the use of the transmitted information;
wherein the file to be used for the updating is a compressed differential file specifying the differences between the software installed in the user terminal and the new version, and
the compressed differential file is expanded at the user terminal only after all unnecessary files are deleted from the user terminal.

3. A software updating method for implementation in a system including a user terminal device and a file server, both connected to a network, the method comprising:
storing a file for updating software installed in the user terminal device to a latest version software in the file server;
storing identification information for specifying the file server storing the file for updating to the latest version software and list information indicating a list of a file name necessary for executing the latest version software on the user terminal device in a version information server;

storing information pertaining to operating systems of a plurality of user terminal devices in an environment information server, the environment information server detecting an operating system of the user terminal device;

controlling the user terminal device to access the environment information server to obtain the detection result and to access the version information server to obtain the identification information and the list information from the version information server, and to make the user terminal device access the file server based on the obtained identification information to obtain a file corresponding to the detected operating system of the user terminal device and the latest version of the software from the file server through the network, the file server being determined based on a location of the user terminal device; and controlling the user terminal device so as to update existing software to the latest version software based on the obtained file and to make the user terminal device delete a file unnecessary for execution of the latest version software based on the list information obtained from the version information file;

wherein the file to be used for the updating is a compressed differential file specifying the differences between the software installed in the user terminal and the latest version, the compressed differential file is expanded at the user terminal only after all unnecessary files are deleted from the user terminal.

4. A method of updating software at a user terminal, the method comprising:

accessing a file server storing a file for updating to a latest version software through a network, the file server being determined based on a location of the user terminal;

accessing an environment information server storing information pertaining to operating systems of a plurality of user terminal devices to obtain a result of the environment information server detecting an operating system of the user terminal;

obtaining a file corresponding to the latest version of the software and the detected operating system of the user terminal device from the file server; and updating existing software to the latest version software based on the obtained file, comprising:

accessing a version information server storing identification information for specifying the file server storing the file for updating to the latest version software through the network, obtaining the identification information from the version information server, accessing the file server storing the file corresponding to the latest version of the software through the network based on the obtained identification information, obtaining a list of a file name necessary for executing the latest version software, and deleting a file unnecessary for executing the latest version software based on the list of the necessary file name;

wherein the file to be used for the updating is a compressed differential file specifying the differences between the software at the user terminal and the latest version, and the compressed differential file is expanded at the user terminal only after all unnecessary files are deleted from the user terminal.

5. A software updating method for performing updating of software used in a user terminal device, the method comprising:

judging, by referring to a version information server, whether a version of the software that is used in the user terminal device is a new version; and determining, using an environment information server that stores information pertaining to operating systems of a plurality of user terminal devices, a result of the environment information server detecting an operating system of the user terminal device;

sending a file from a file server to the user terminal to be used for the update to the new version according to the detected operating system of the user terminal device, the version of the software and list information indicating files necessary for execution of the software after the update to the user terminal device, the file server being determined based on a location of the user terminal device, thereby making it possible to specify a file unnecessary for the user terminal device when the version is judged not to be the new version;

wherein the file to be used for the updating is a compressed differential file specifying the differences between the software used in the user terminal and the new version, and the compressed differential file is expanded at the user terminal only after all unnecessary files are deleted from the user terminal.

6. A processor encoded with a software updating program for carrying out a method of updating software used in the user terminal device, the method comprising:

a step of accessing a version information server storing information for specifying a new version of software installed in the user terminal device when the software that is an object of update is initiated, and judging whether the software of the user terminal device is the new version based on the information for specifying the new version;

a step of accessing an environment information server that stores information pertaining to operating systems of a plurality of user terminal devices, the environment information server detecting an operating system of the user terminal device;

a step of accessing a file server storing a file for updating the software when the software is judged not to be the new version software, the file corresponding to and the detected operating system of the user terminal device, the file server being determined based on a location of the user terminal device, and transmitting the file to be used for the update of the software from the file server to the user terminal device;

a step of updating the software of the object of the update to the new version based on the transmitted file;

a step of transmitting information indicating a file necessary for execution of the software updated to the new version to the user terminal device; and a step of specifying a file unnecessary for the execution of the updated software in the user terminal device by the use of the transmitted information to inform the specified file to the user terminal device for making it possible to delete the unnecessary file;

wherein the file to be used for the updating is a compressed differential file specifying the differences between the software used in the user terminal and the new version, and the compressed differential file is expanded at the user terminal only after all unnecessary files are deleted from the user terminal.

7. A software updating system for updating software used in a user terminal device, the system comprising:

a file server storing a file for updating software stored in the user terminal device to a new version, the file server being determined based on a location of the user terminal device;

an environment information server for storing information pertaining to operating systems of a plurality of user terminal devices; and a version information server for storing version information indicative of the new version and identification information indicative of the file server, wherein the version information server transmits the identification information to the user terminal upon initiation of the software at the user terminal, the file server transmits the file to be used for the updating to the user terminal device and the environment information server detects the operating system of the user terminal device to be updated to the new version and transmits the detection result to the user terminal device when the user terminal device requests the file, and the file server transmits the file to be used for the update to the new version corresponding to the operating system of the user terminal device to the user terminal device according to the detection result of the environment information server, one of the group consisting of the version information server and the file server stores a list of a file necessary for execution of the software that has been updated to the new version, and transmits the information indicating the list to the user terminal device, the user terminal device accepts the information indicating the list and deletes a file unnecessary for executing the new version software based on the accepted information, the file to be used for the updating is a compressed differential file specifying the differences between the software stored in the user terminal and the new version, and the compressed differential file is expanded at the user terminal only after all unnecessary files are deleted from the user terminal.

8. The software updating system according to claim 7, wherein one of the version information server and the file server stores a list of the file unnecessary for the execution of the new version of the software and transmits the information indicating the list to the user terminal device.

9. The software updating system according to claim 7, wherein the file server stores a plurality of files for the update to the new version according to a version of the software capable of being installed in the user terminal device and an operating system of the user terminal device.

10. The software updating system according to claim 9, wherein every time the revision to the latest version of the software is performed, the environment server records information of revision date and time.

11. The software updating system according to claim 10, wherein the environment server determines the completion of the updating in the user terminal for each operating system of the user terminal devices based on information that identifies the operating systems of the user terminal devices and information of the last updated dates and times that are available from the revision dates and times, and notifies availability of a file for deletion according to at least a result of the determination so as to enable the revision to the version that is stored in the file server.

12. A software updating system having a user terminal device connected to a network and having predetermined software installed therein, and a file server connected to the network and storing a file for updating the software installed in the user terminal device to a latest version software, the system comprising:

a version information server for storing identification information for specifying the file server storing the file for updating the software to the latest version software, and for storing list information for indicating a list of file names necessary for execution of the latest version software on the user terminal device; and an environment information server for storing information pertaining to operating systems of a plurality of user terminal devices, the environment information server detecting the operating system of the user terminal device to be updated to the new version and transmitting the detection result to the user terminal device;

wherein the user terminal device comprises:

obtaining means for accessing the version information server to obtain the identification information and the list information and for accessing the file server based on the obtained identification information to obtain a file corresponding to the latest version of the software and the detected operating system of the user terminal device from the file server through the network, the file server being determined based on a location of the user terminal device, updating means for updating existing software to the latest version software, and unnecessary file deleting means for deleting a file unnecessary for execution of the latest version software, the file to be deleted being determined based on the list;

wherein the file to be used for the updating is a compressed differential file specifying the differences between the software installed in the user terminal and the latest version, and the compressed differential file is expanded at the user terminal only after all unnecessary files are deleted from the user terminal.

13. A software updating system for performing updating of software used in a user terminal device, the system comprising:

a file server storing a file for updating software stored in the user terminal device to a new version;

an environment information server for storing information pertaining to operating systems of a plurality of user terminal devices; and a version information server storing version information for specifying the new version of the software used in the user terminal device and identification information for specifying the file server storing the file for updating the software to the new version, wherein the version information server transmits the identification information of the file server storing the file used in updating to the user terminal device when the software used in the user terminal device is not the new version, the file server transmits the file to be used for the version up to the user terminal device and the environment information server detects the operating system of the user terminal device to be updated to the new version and transmits the detection result to the user terminal device when the user terminal device requests the file, the file server being determined based on a location of the user terminal device, and the file server transmits the file to be used for the update to the new version corresponding to the operating system of the user terminal device to the user terminal device according to the detection result of the environment information server, one of the version information server and the file server stores a list of a file necessary for execution of the software that has been updated to the new version and transmits the list information for specifying a file unnecessary for the user terminal device, the file to be used for the updating is a compressed differential file specifying the differences between the software stored in the user terminal and the new version, and the compressed differential file is expanded at the user terminal only after all unnecessary files are deleted from the user terminal.

* * * * *